United States Patent
Kruegel et al.

(10) Patent No.: US 8,781,132 B2
(45) Date of Patent: Jul. 15, 2014

(54) METHOD AND DEVICE FOR MANAGING ENCRYPTED GROUP REKEYING IN A RADIO NETWORK LINK LAYER ENCRYPTION SYSTEM

(71) Applicant: Motorola Solutions, Inc., Schaumburg, IL (US)

(72) Inventors: Chris A. Kruegel, Plainfield, IL (US); Thomas J. Senese, Schaumburg, IL (US); Hans C. Sowa, Schaumburg, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 12 days.

(21) Appl. No.: 13/678,747

(22) Filed: Nov. 16, 2012

(65) Prior Publication Data
US 2013/0243195 A1  Sep. 19, 2013

Related U.S. Application Data

(60) Provisional application No. 61/612,586, filed on Mar. 19, 2012.

(51) Int. Cl.
*H04L 9/08* (2006.01)
*H04W 12/04* (2009.01)
*H04L 29/06* (2006.01)

(52) U.S. Cl.
CPC ............. *H04W 12/04* (2013.01); *H04L 63/065* (2013.01); *H04L 63/068* (2013.01)
USPC ............................. 380/281; 380/273; 380/278

(58) Field of Classification Search
CPC ... H04L 9/0833; H04L 63/065; H04L 9/0891; H04L 2209/80; H04L 63/062; H04L 2209/601; H04W 12/04
USPC .......................................... 380/281, 273, 278
See application file for complete search history.

(56) References Cited

U.S. PATENT DOCUMENTS

| 7,907,733 B2 | 3/2011 | Cho et al. |
| 8,195,956 B2 | 6/2012 | Bilodi |

(Continued)

FOREIGN PATENT DOCUMENTS

| EP | 2517400 A2 | 10/2012 |
| WO | 2004030294 A1 | 4/2004 |

(Continued)

OTHER PUBLICATIONS

Hung-Min Sun, et al. An Efficient Rekeying Scheme for Multicast and Broadcast (M&B) in Mobile WiMAX; 2008 IEEE Asia-Pacific Services Computing Conference; 6 Pages.

(Continued)

*Primary Examiner* — Andrew Nalven
*Assistant Examiner* — Mary Li
(74) *Attorney, Agent, or Firm* — Daniel R. Bestor

(57) ABSTRACT

Disclosed is a radio system, method, and device for a mobile station to indicate to an authentication controller, in an authentication response message, which of a plurality of group key link layer encryption keys (GKEK)s it currently has in its possession, and to work with the authentication controller to more intelligently manage multiple GKEKs. The authentication controller can use the information obtained from the authentication response message to determine which of a plurality of GKEKs to advertise in a key announcement broadcast. Furthermore, individual requests for a future LLE key (LEK) to be used for link layer encryption (LLE) encrypting and decrypting inbound and outbound group communications between base station(s) and mobile station(s) are responded to with a broadcast GKEK-encrypted transmission including the future LEK. Only the requesting mobile station transmits an acknowledgment packet in response to the broadcast.

25 Claims, 10 Drawing Sheets

(56) References Cited

U.S. PATENT DOCUMENTS

| | | | |
|---|---|---|---|
| 8,306,229 B2 * | 11/2012 | Pang et al. | 380/278 |
| 8,369,529 B1 | 2/2013 | Agarwal et al. | |
| 2005/0047598 A1 | 3/2005 | Kruegel | |
| 2006/0133614 A1 | 6/2006 | Zhang et al. | |
| 2007/0223703 A1 * | 9/2007 | Verma et al. | 380/278 |
| 2007/0253554 A1 | 11/2007 | Chesson et al. | |
| 2009/0034736 A1 | 2/2009 | French | |
| 2009/0103724 A1 | 4/2009 | Tamai | |
| 2010/0020974 A1 * | 1/2010 | Tsai et al. | 380/270 |
| 2011/0096929 A1 | 4/2011 | Seleznev et al. | |
| 2011/0135097 A1 | 6/2011 | Redfern et al. | |
| 2011/0150223 A1 | 6/2011 | Qi et al. | |
| 2013/0223622 A1 | 8/2013 | SOWA et al. | |

FOREIGN PATENT DOCUMENTS

| | | | | |
|---|---|---|---|---|
| WO | WO2006132512 | * | 12/2006 | H04L 9/00 |
| WO | 2009120711 A2 | | 10/2009 | |
| WO | 2009142785 A2 | | 11/2009 | |

OTHER PUBLICATIONS

Matthew Ginley, et al. "Efficient and Secure Multicast in Wirelessman", 2007 IEEE; 6 Pages.

TIA/EIA Standard; Project 25; Digital Radio Over-The-Air Rekeying (OTAR) Protocol; Apr. 12, 2001; 216 Pages.

PCT International Search Report Dated June 5, 2013 for Counterpart Application PCT/US2013/027419.

PCT International Search Report Dated May 30, 2013 for Counterpart Application PCT/US2013/025549.

* cited by examiner

METHOD AND DEVICE FOR MANAGING ENCRYPTED GROUP REKEYING IN A RADIO NETWORK LINK LAYER ENCRYPTION SYSTEM

FIELD OF THE DISCLOSURE

The present disclosure relates to a processor, a method, and a device for encrypted group rekeying in a radio network supporting link layer encryption (LLE) and/or decryption.

BACKGROUND

Wireless communication systems provide for radio communication links to be arranged within the system between a plurality of user terminals. Such user terminals may be mobile and may therefore be known as "mobile stations." At least one other terminal, e.g. used in conjunction with mobile stations, may be a fixed terminal, e.g. a control terminal, base station, or access point. Such a system typically includes a system infrastructure which generally includes a network of various fixed installations such as base stations, which are in direct radio communication with the mobile stations. Each of the base stations operating in the system may have one or more transceivers which may, for example, serve mobile stations in a given local region or area, known as a "cell" or "site", by radio frequency (RF) communication. The mobile stations which are in direct communication with a particular base station are said to be served by the base station, and all radio communications to and from each mobile station within the system are made via respective serving base stations. Sites of neighbouring base stations in a wireless communication system may be offset from one another or may be overlapping.

Wireless communication systems may operate according to an industry standard protocol such as, for example, the Project 25 (P25) standard defined by the Association of Public Safety Communications Officials International (APCO), or other radio protocols. Further details regarding the P25 standards can be obtained from the Telecommunications Industry Association, 2500 Wilson Boulevard, Suite 300 Arlington, Va. Communications in accordance with P25 or other standards may take place over physical channels in accordance with one or more of a TDMA (time division multiple access) protocol, a FDMA (frequency divisional multiple access), or CDMA (code division multiple access) protocol. Mobile stations in wireless communication systems such as P25 systems send user communicated speech and data, herein referred to collectively as 'traffic information', in accordance with the designated protocol.

Many wireless communication systems, including many P25 systems, employ a procedure to encrypt sensitive communicated traffic information, especially where the information is sent via insecure channels, e.g. by wireless communication over-the-air. For example, in some wireless communication systems, communications can be end-to-end encrypted. This means that encryption of traffic information is applied by an original transmitting terminal of the sender (source) of the traffic information and removed by a final receiving terminal of the recipient (destination) of the traffic information. Intermediate terminals that facilitate the delivery of the encrypted traffic information are unable to decrypt the encrypted traffic information (or at least, are unable to do so in a reasonable amount of time).

In addition to end-to-end encryption, link layer encryption (LLE) may additionally be used between individual links in a path from a source transmitter to a destination receiver to further prevent the interception or monitoring of traffic information transmitted over-the-air, such as between mobile stations and base stations. For example, even when end-to-end encryption is used to encrypt digitized voice or data, some control and/or signalling data is necessarily sent unencrypted over-the-air to allow the receiving device (such as the base station or mobile station) to identify a sender or receiver, talkgroup ID, or to obtain information such as an algorithm ID or key ID sufficient to begin decrypting the end-to-end encrypted voice data. LLE may be used in this situation, for example, to encrypt the over-the-air communication links between mobile stations and base stations, and advantageously prevent an eavesdropper from intercepting information transmitted over-the-air, including control and/or signalling data such as group ID's, transmitter ID's, target ID's, algorithm IDs, key IDs, or other information.

FIG. 1 illustrates an example of how encryption may be achieved between a transmitter 101 and receiver 103 over an intervening channel 105 (e.g., air-interface) by producing a random or pseudo-random data sequence of binary digits (e.g., an encryption initialization vector 111) and using a combining procedure (e.g., an encryption algorithm 115) to combine the encryption initialization vector 111 with a secret key variable 113 supplied by the user. The combination generates another data sequence, known as a keystream, incorporating the secret key variable 113. The keystream, or a portion of it, is then used internally by the encryption algorithm 115 to encrypt the user traffic information 117 to be transmitted in encrypted form as encrypted traffic information 133. This is done in an encryption processor by using a combination procedure, such as an XOR (exclusive OR) combination procedure, to combine the unencrypted traffic information 117 with the keystream, e.g. on a frame-by-frame basis. The encryption initialization vector 111 may be loaded into a linear feedback shift register (LFSR), for example, and may be clocked to provide a time-varying keystream.

The secret key variable 113 used at the transmitter 101 is known at the receiver 103 and is thus never transmitted openly (e.g., unencrypted). The receiver 103 is sent the encryption initialization vector 111, an identifier identifying the encryption algorithm 115 used at the transmitter 101 (assuming it is not hardcoded in both transmitter 101 and receiver 103), and an identifier identifying the key variable 113 used at the transmitter 101 (assuming it is not hardcoded in both transmitter 101 and receiver 103) via a sync block 131 transmitted over the channel 105 and included in one or more of a header information structure or embedded in a data payload frame. The transmitter 101 also transmits the encrypted traffic information 133 over the channel 105 for reception by the receiver 103. The receiver 103 is thereby able to re-construct the keystream applied at the transmitter 101. The receiver 103 combines the reconstructed keystream with the encrypted traffic 133 it receives in a manner such that the keystream included in the encrypted traffic 133 is cancelled allowing the original user traffic 163 to be extracted in unencrypted form. For example, the receiver 103 may use a same clocked LFSR as used by the transmitter 101 to provide a same time-varying keystream using the retrieved encryption initialization vector 111 transmitted in the sync block 131.

The encryption/decryption process therefore typically includes (i) operation of an encryption algorithm in a processor of a transmitting terminal to encrypt the information to be transmitted, and (ii) operation of a related decryption algorithm in a receiving terminal to decrypt the received encrypted traffic information.

Because an LLE encryption key can, given enough time and computing power, be brute-force decoded by an intercepting device, many LLE encryption/decryption processes incorporate a rekeying procedure in which the shared key used by the transmitter(s) and receiver(s) to encrypt and decrypt communications will be periodically changed. A period during which a particular shared key is used to encrypt and decrypt communications (between one or more transmitting devices and one or more receiving devices) may be referred to as a crypto period. For example, at a predetermined period in time, an authentication controller in a radio network may decide to switch from a current shared LLE key to a new shared LLE key. When this occurs, a number of individual rekey requests generated by mobile stations seeking the new shared key (in order to LLE decrypt communications encrypted with the shared key) can overwhelm the authentication controller and/or the over-the-air bandwidth available to transmit what may be a significant amount of data (new shared keys to each requesting mobile station). This situation can arise with respect to requests for new LLE keys used to encrypt and/or decrypt group communications between base stations and mobile stations, and for new group key link layer encryption keys (GKEKs) used to encrypt and/or decrypt group LLE key update transmission(s) that themselves include the new LLE key(s).

Established air-interface protocols such as P25 may not provide sufficient available over-the-air bandwidth to satisfy each of the individual rekey requests without incurring substantial delays and/or performance degradation. Furthermore, such established air-interface protocols may not provide a means for the authentication controller to determine which, and how many out of a total number of currently operating (or previously operating), mobile stations have one or more out of a plurality of possible GKEKs. Accordingly, what is needed is an improved method, device, and system for group LLE key rekeying that can aid in reducing over-the-air bandwidth requirements, preventing substantial delays and performance degradation, and allows for more intelligent management and distribution of GKEKs.

DETAILED DESCRIPTION

Figure 1:
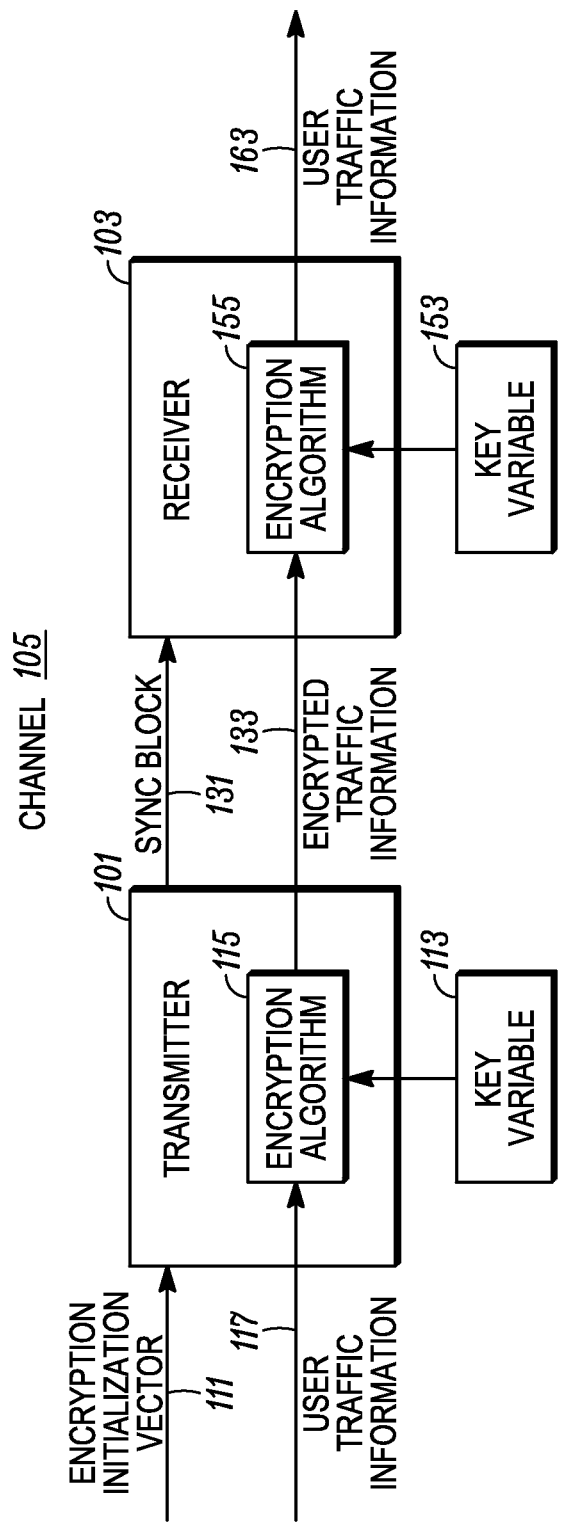
FIG. 1 is a block diagram illustrative of a conventional encryption/decryption system.

In light of the foregoing, it would be advantageous to introduce a radio system, method, and device for managing multiple group key link layer encryption keys (GKEKs), applicable to air-interface protocols such as P25, that reduces over-the-air bandwidth requirements, prevents substantial delays and performance degradation, and more intelligently manages and distributes multiple GKEKs. In addition, it would be advantageous to introduce a radio system, method, and device for a mobile station to indicate to an authentication controller which GKEKs it currently has in its possession, and can work with the authentication controller to more intelligently manage multiple GKEKs. Furthermore, it would be advantageous to provide a radio system, method, and device that, when an individual request for a future link layer encryption key (LEK) to be used for LLE encrypting and decrypting inbound and outbound group communications between base station(s) and mobile station(s) operating within corresponding coverage area(s) of the base station(s), responds with a broadcast GKEK-encrypted transmission including the future LEK so that all mobile stations have an opportunity to receive the future LEK at that time, and where only the requesting mobile station transmits an acknowledgment packet in response to the broadcast.

In one example, a radio network communications device broadcasts a first key announcement broadcast (KAB) outgoing signalling packet indicating (i) a first group key link layer encryption key (GKEK) used for LLE encrypting and decrypting updated future LLE keys (LEKs), the updated future LEKs to be used for LLE encrypting and decrypting inbound and outbound group communications between a base station and mobile stations operating within a corresponding coverage area of the base station, and (ii) at least a second GKEK; receives, via respective authentication response inbound signalling packets from each of the mobile stations, an indication of which GKEKs each mobile station has in its possession, and stores the indications; determines, as a function of the indications of which GKEKs each mobile station has in its possession, which one of the first GKEK and the second GKEK is possessed by a greater number of the mobile stations; and causes a first updated future LEK to be encrypted via the determined one of the first GKEK and the second GKEK, and broadcast to the mobile stations.

In another example, a mobile station receives a first key announcement broadcast (KAB) outgoing signalling packet indicating (i) a first group key link layer encryption key (GKEK) used for LLE encrypting and decrypting updated future LLE keys (LEKs), the updated future LEKs to be used for LLE encrypting and decrypting inbound and outbound group communications between a base station and mobile stations operating within a corresponding coverage area of the base station, and (ii) at least a second GKEK; during authentication with the radio network, transmits an authentication response inbound signalling packet indicating which GKEKs, of at least the first and second GKEKs, the mobile station has in its possession; receives a first updated future LEK broadcast encrypted via one of the first GKEK and the second GKEK; and decrypts and retrieves the first updated future LEK using the one of the first GKEK and second GKEK as indicated in the received broadcast.

In still a further example, a radio network communications device, in response to receiving an individual request for an updated future LLE key (LEK), to be used for LLE encrypting and decrypting inbound and outbound group communications between a base station and a plurality of mobile stations operating within a corresponding coverage area of the base station, from a particular one of the plurality of mobile stations, causes the updated future LEK to be re-broadcast to the mobile stations encrypted via a first group key link layer encryption key (GKEK), the first GKEK used for LLE encrypting and decrypting updated future LEKs.

Each of these embodiments will be discussed in more detail below, starting with example network and device architectures of the system in which the embodiments may be applied, followed by a discussion of GKEK management from the viewpoint of the authentication controller and then the mobile station.

I. Network and Device Architecture

Figure 2:
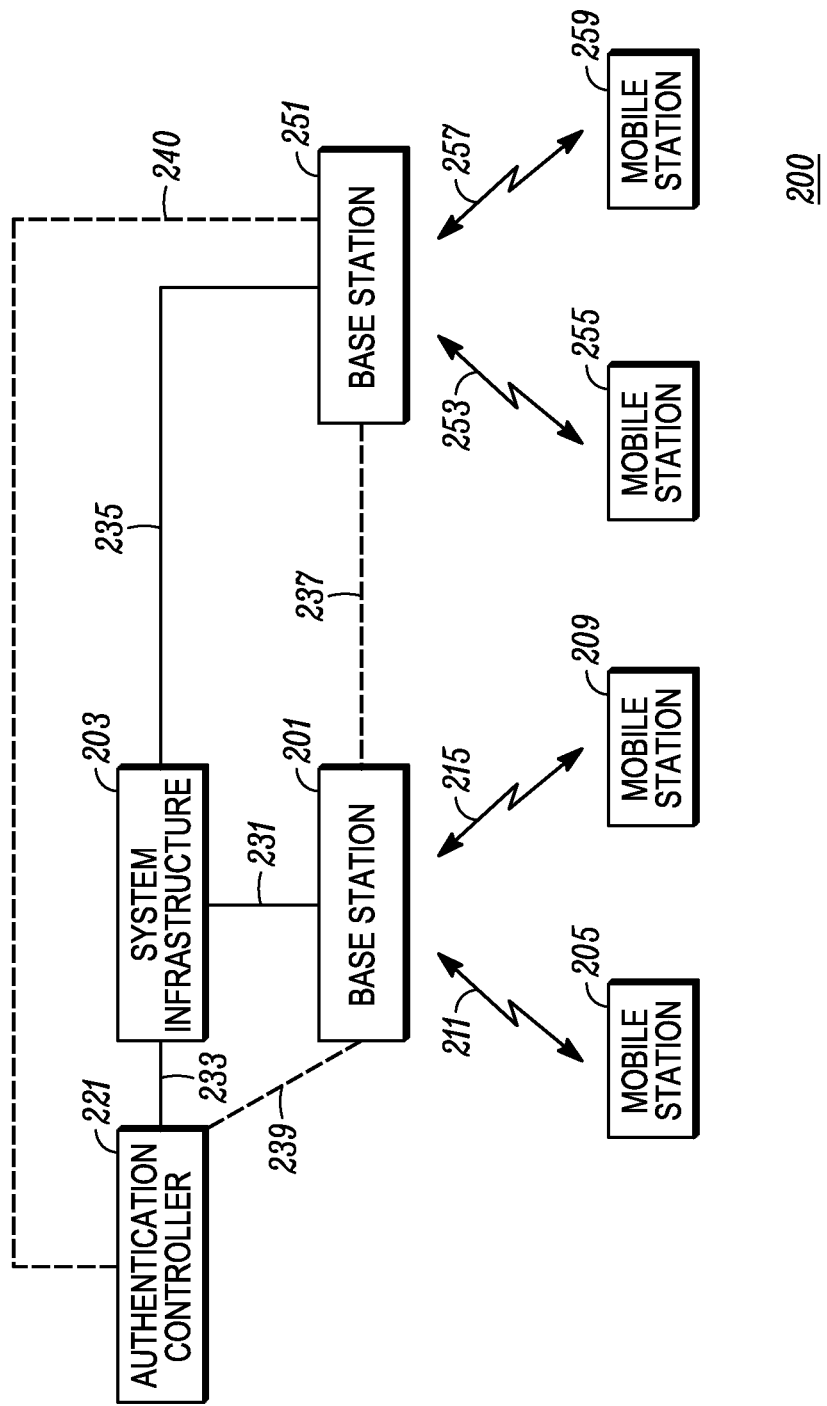
FIG. 2 is a schematic diagram of a wireless communication system in accordance with an embodiment.

FIG. 2 shows a wireless radio communication system 200 which may be adapted in accordance with an embodiment of the disclosure. It will be apparent to those skilled in the art that the system 200 and the components which are to be described as operating therein may take a number of forms well known to those skilled in the art. Thus, the layout of the system 200, and of its operational components to be described, should be regarded as illustrative rather than limiting. The system 200 of FIG. 2 will be described as an illustrative wireless communication system such as a system capable of operating in accordance with the P25 standard, but may be equally applied to other currently known and/or future standards protocols, such as Digital Mobile Radio (DMR).

The system 200 shown in FIG. 2 includes one or more base stations 201, 251 operably connected to a system infrastructure 203 via respective wired or wireless links 231, 235. As used herein, the term "base station" (BS) refers to any entity that includes a transmitter and/or receiver to perform the functionality of receiving data (voice, images, video, text, etc.) from a signal source (e.g. mobile station 205) and transmitting it to one or more signal destinations (e.g., mobile station 209, mobile station 255, system infrastructure 203, etc.). For example, the BS 201 may comprise, among other possibilities, a cellular wireless base station, a two-way radio repeater, an IEEE 802-based wireless access points, or other similar devices.

The BS 201 has radio links with a plurality of mobile stations, particularly mobile stations (MSs) in a service cell or site at least partially defined by a geographic location of the BS 201. In addition to MSs, BS 201 may maintain a direct wireless or wired link 239 (or indirect via system infrastructure 203) with an authentication controller 221 or other radio network communications device including authentication services (such as a zone controller). While the authentication controller 221 is illustrated as a separate entity in the system 200, in other embodiments, the authentication controller 221 may be integrated with other devices (such as a zone controller) in system infrastructure 203 and/or may be integrated into one or more of BSs 201, 251. The authentication controller 221 may be configured to provide authentication services to BS 201 so that mobile stations operating within its coverage area may be authenticated via communications involving the authentication controller 221, BS 201, and mobile stations 205, 209. Two MSs 205, 209 are illustrated in FIG. 2 as being within the service area of, and being registered with, BS 201 via respective radio links 211, 215. The BS 201 thereby serves MSs including the MSs 205, 207 with radio communications to and from other terminals, including (i) MSs served by the BS 201, (ii) MSs served by other BSs such as BS 251, (iii) other terminals including MSs in other systems (not shown) operably linked to the system 200 via the system infrastructure 203, and (iv) a console (not shown).

BS 251 similarly has radio links with a plurality of MSs, particularly MSs in a service cell or site at least partially defined by a geographic location of the BS 251. In addition to MSs, BS 251 may maintain a direct wireless or wired link 240 (or indirect via system infrastructure 203) with the authentication controller 221 or other controller including authentication services (such as a zone controller). The authentication controller 221 may be configured to provide authentication services to BS 251 so that mobile stations operating within its coverage area may be authenticated via communications involving the authentication controller 221, BS 251, and mobile stations 255, 259. Two MSs 255, 259 are illustrated in FIG. 2 as being within the service area of, and being registered with, BS 251 via respective radio links 253, 257. The BS 251 thereby serves MSs including the MSs 255, 259 with radio communications to and from other terminals, including (i) MSs served by the BS 251, (ii) MSs served by other BSs such as BS 201, (iii) other terminals including MSs in other systems (not shown) operably linked to the system 200 via the system infrastructure 203, and (iv) a console (not shown).

The system infrastructure 203 includes known sub-systems (not shown) required for operation of the system 200. Such sub-systems may include, for example, sub-systems providing additional authentication, routing, MS registration and location, system management and other operational functions within the system 200. The system infrastructure 203 may also provide routes to other BSs (not shown) providing cells serving other MSs, and/or may provide access to other types of networks such as a plain old telephone system (POTS) network or a data-switched network such as the Internet. The system infrastructure 203 may also maintain a separate link 233 to the authentication controller 221 for allowing configuration of the authentication controller 221 (perhaps via a console, not shown).

Figure 3:
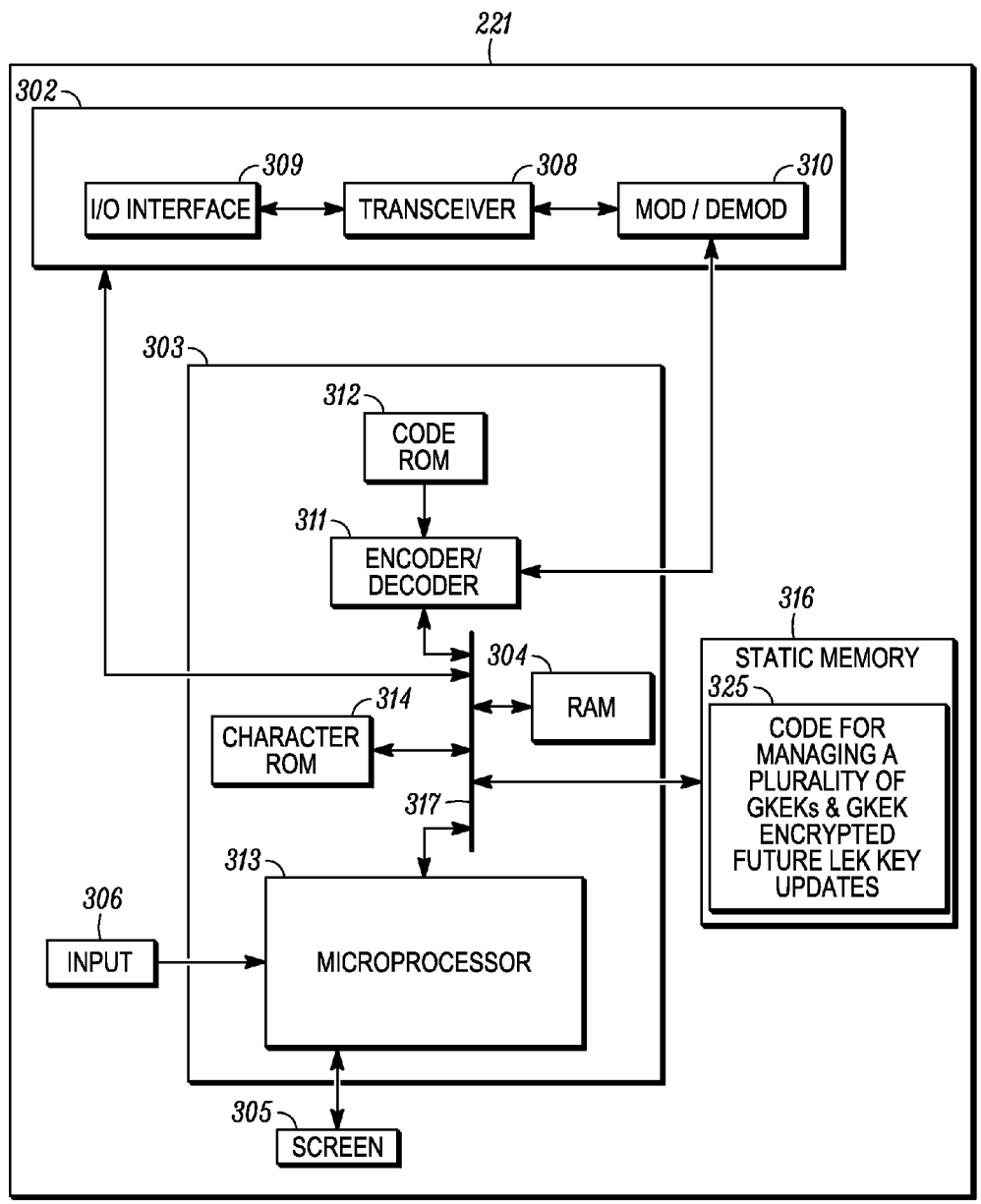
FIG. 3 is a block diagram of an illustrative layout of a base station of the system of FIG. 2 in accordance with an embodiment.

FIG. 3 is an example functional block diagram of an authentication controller 221 operating within the system 200 of FIG. 2 in accordance with some embodiments. As shown in FIG. 3, authentication controller 221 includes a communications unit 302 coupled to a common data and address bus 317 of a processing unit 303. The authentication controller 221 may also include an input unit (e.g., keypad, pointing device, etc.) 306 and a display screen 305, each coupled to be in communication with the processing unit 303.

The processing unit 303 may include an encoder/decoder 311 with an associated code Read Only Memory (ROM) 312 for storing data for encoding and decoding voice, data, control, or other signals that may be transmitted or received between other BSs or MSs in the system 200. The processing unit 303 may further include a microprocessor 313 coupled, by the common data and address bus 317, to the encoder/decoder 311, a character ROM 314, a Random Access Memory (RAM) 304, and a static memory 316.

The communications unit 302 may include one or more wired or wireless input/output (I/O) interfaces 309 that are configurable to communicate with MSs such as MSs 205, 209, with BSs such as BS 201, 251 and/or with the system infrastructure 203. The communications unit 302 may include one or more wireless transceivers 308, such as a Digital Mobile Radio (DMR) transceiver, an APCO P25 transceiver, a Bluetooth transceiver, a Wi-Fi transceiver perhaps operating in accordance with an IEEE 802.11 standard (e.g., 802.11a, 802.11b, 802.11g), a WiMAX transceiver perhaps operating in accordance with an IEEE 802.16 standard, and/or other similar type of wireless transceiver configurable to communicate via a wireless radio network. The communications unit 302 may additionally include one or more wireline transceivers 308, such as an Ethernet transceiver, a Universal Serial Bus (USB) transceiver, or similar transceiver configurable to communicate via a twisted pair wire, a coaxial cable, a fiber-optic link or a similar physical connection to a wireline network. The transceiver 308 is also coupled to a combined modulator/demodulator 310 that is coupled to the encoder/decoder 311.

The microprocessor 313 has ports for coupling to the input unit 306 and to the display screen 305. The character ROM 314 stores code for decoding or encoding data such as control channel messages and/or data or voice messages that may be transmitted or received by the authentication controller 221. Static memory 316 may store operating code for the microprocessor 313 that, when executed, determines which MSs have at least first and second GKEK keys indicated in a previous key announcement broadcast message and manages a plurality of GKEKs and provides GKEK-encrypted future LEKs in accordance with FIGS. 5-9 and the accompanying text. Static memory 316 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, to name a few.

Figure 4:
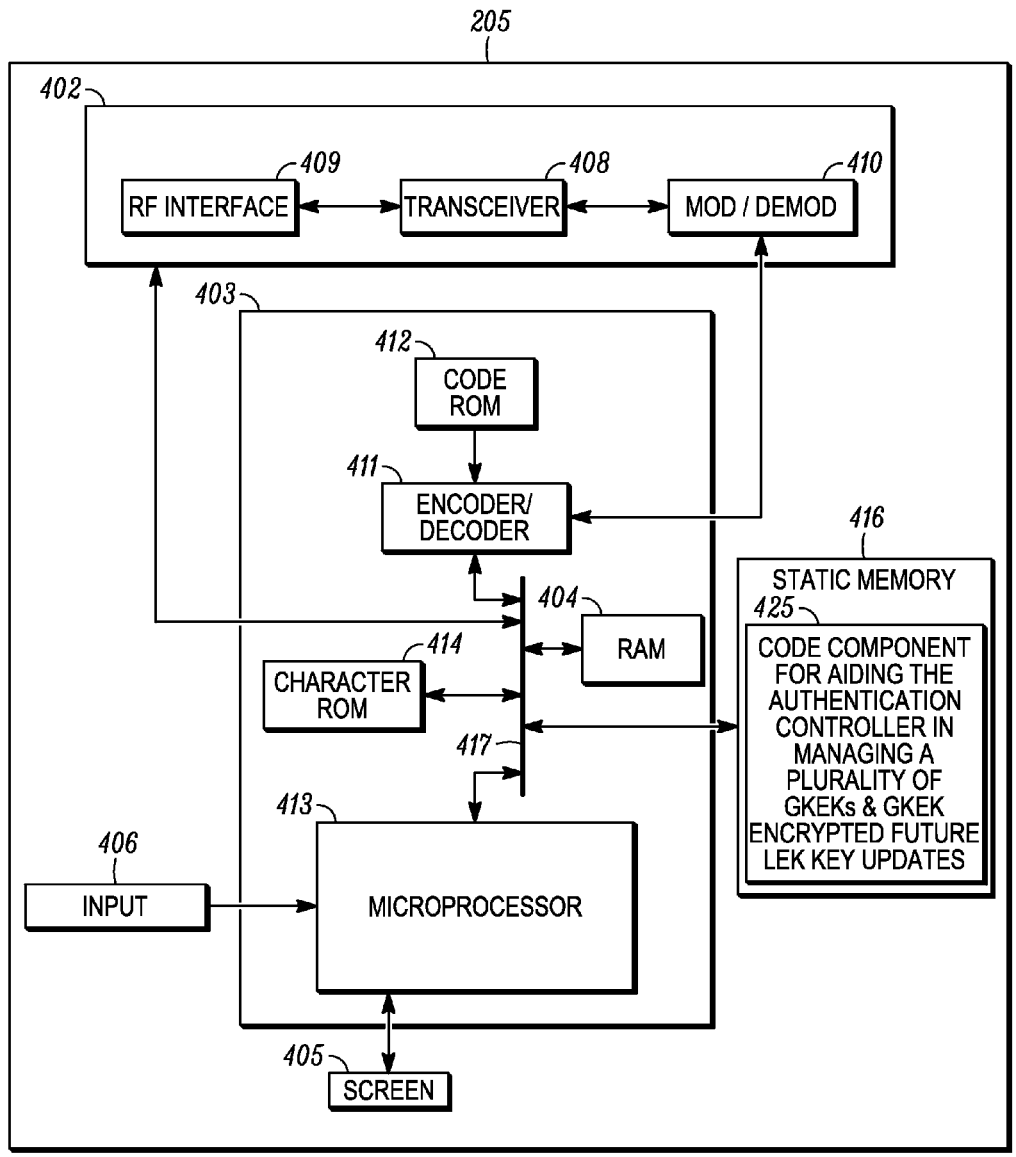
FIG. 4 is a block diagram of an illustrative layout of a mobile station of the system of FIG. 2 in accordance with an embodiment.

FIG. 4 is an example functional block diagram of a mobile station such as MS 205 operating within the system 200 of FIG. 2 in accordance with some embodiments. Other MSs such as MSs 209, 255, and 259 may contain same or similar structures. As shown in FIG. 4, MS 205 includes a communications unit 402 coupled to a common data and address bus 417 of a processing unit 403. The MS 205 may also include an input unit (e.g., keypad, pointing device, etc.) 406 and a display screen 405, each coupled to be in communication with the processing unit 403.

The processing unit 403 may include an encoder/decoder 411 with an associated code ROM 412 for storing data for encoding and decoding voice, data, control, or other signals that may be transmitted or received between other BSs or MSs in the same radio site as MS 205, or perhaps between other MSs in a remote radio site. The processing unit 403 may further include a microprocessor 413 coupled, by the common data and address bus 417, to the encoder/decoder 411, a character ROM 414, a Random Access Memory (RAM) 404, and a static memory 416.

The communications unit 402 may include an RF interface 409 configurable to communicate with other MSs such as MSs 209, 255, 259 and with BSs such as BSs 201, 251. The communications unit 402 may include one or more wireless radio transceivers 408, such as a DMR transceiver, an APCO P25 transceiver, a TETRA transceiver, a Bluetooth transceiver, a Wi-Fi transceiver perhaps operating in accordance with an IEEE 802.11 standard (e.g., 802.11a, 802.11b, 802.11g), a WiMAX transceiver perhaps operating in accordance with an IEEE 802.16 standard, and/or other similar type of wireless transceiver configurable to communicate via a wireless network. The transceiver 408 is also coupled to a combined modulator/demodulator 410 that is coupled to the encoder/decoder 411.

The microprocessor 413 has ports for coupling to the input unit 406 and to the display screen 405. The character ROM 414 stores code for decoding or encoding data such as control channel messages and/or data or voice messages that may be transmitted or received by the MS 205. Static memory 416 may store operating code for the microprocessor 413 that, when executed, generates and transmits an authentication response inbound signalling packet (ISP that reflects which of at least first and second GKEKs indicated in a previously received key announcement broadcast message the MS has in its possession, and works with the authentication controller to more intelligently manage multiple GKEKs and GKEK-encrypted updated future LEKs in accordance with one or more of FIGS. 5 and 7-10 and corresponding text. Static memory 416 may comprise, for example, a HDD, an optical disk drive such as a CD drive or DVD drive, a SSD, a tape drive, a flash memory drive, or a tape drive, to name a few.

II. GKEK and LEK Keys and Crypto Periods Generally

As set forth above, an authentication controller, such as authentication controller 221 of FIG. 2, may manage GKEK keys and crypto periods in order to aid in reducing over-the-air bandwidth requirements, preventing substantial delays and performance degradation, and more intelligently manage and distribute new GKEKs and GKEK-encrypted updated future LEKs.

Figure 5:
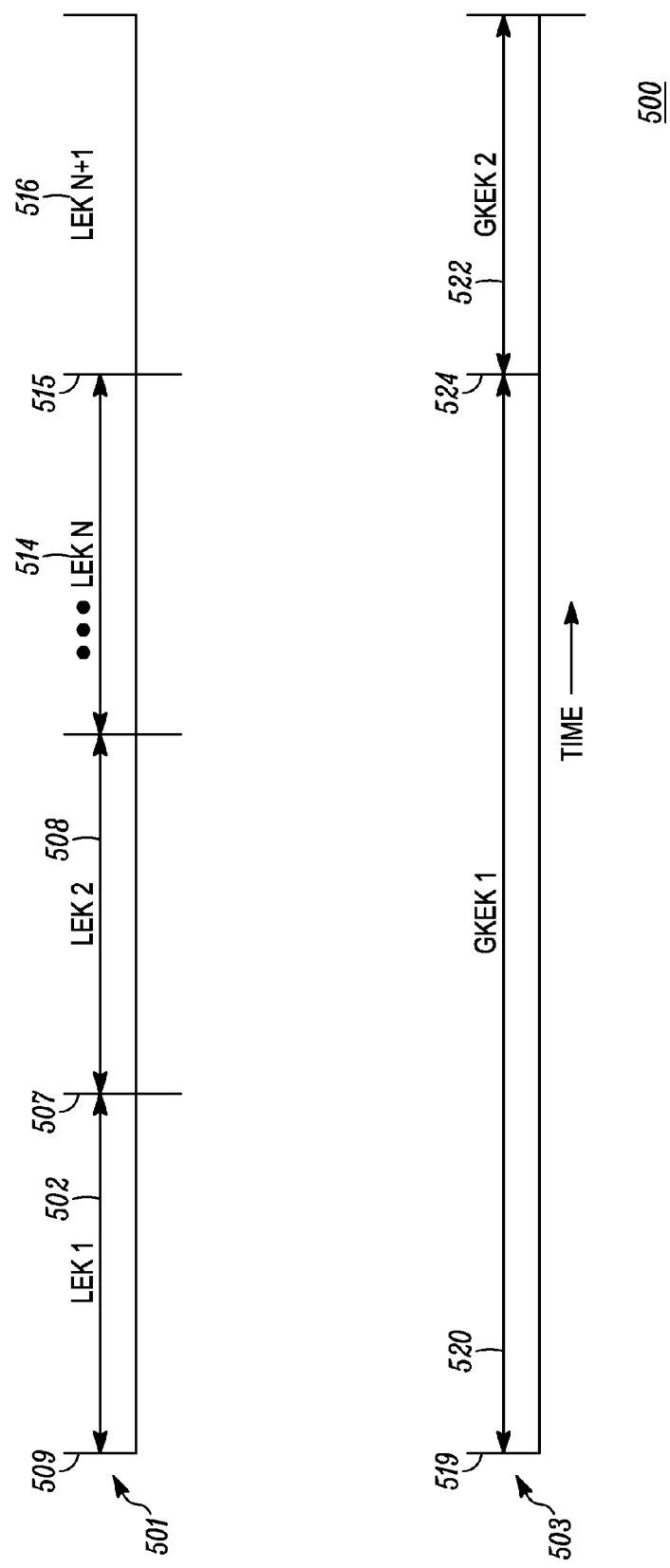
FIG. 5 is a timing diagram of illustrative link layer encryption key (LEK) and group key link layer encryption key (GKEK) crypto periods.

FIG. 5 illustrates a timing diagram 500 of overlapping LEK and GKEK crypto periods. FIG. 5 is just one example of how LEK and GKEK crypto periods may align and/or overlap, and many other possibilities exist consistent with the remainder of this text. In the upper half 501 of the timing diagram 500, a link layer encryption key (LEK) crypto period is illustrated. A LEK is a key pair shared by the fixed network equipment (e.g., BSs 201 and/or 251) and the mobile stations (e.g., MSs 205, 209, 255, and/or 259) correspondingly operating within the BS's coverage area, and is used to LLE encrypt the inbound and outbound air interface links (e.g., links 211, 215, 253, and/or 257) between them (including e.g., voice, audio, video, text, data, etc.), including control and header data, in order to prevent an intercepting device from determining information such as group ID's, source and/or target mobile station radio ID's, and other similar information included in control messages and/or headers. BS 251 and MSs 255 and 259 may use the same LEK or a different LEK than BS 201 and MSs 205, 209. The LEK may be generated at the authentication controller 221 and provided to the BSs 201, 251 and MSs 205, 209, 255, 259 periodically or upon request (e.g., at power-on or at authentication). For example, the LEK may be a common link layer encryption key (CLEK) used to LLE encrypt inbound and outbound communications between the BS and the MSs operating within the corresponding coverage area of the BS during normal operation or a static link layer encryption key (SLEK) used to LLE encrypt inbound and outbound communications between the BS and the MSs operating within the corresponding coverage area of the BS when network connectivity between the BS and the rest of the radio network is reduced or eliminated. Other possibilities exist as well.

In a lower half 503 of the timing diagram 500, GKEK crypto periods are illustrated. GKEKs are shared by a plurality of MSs to enable group key updates (e.g., GKEKs may be used to distribute the CLEKs and/or SLEKs described above to groups of MSs at a time). The purpose of the GKEK keys pairs and associated GKEK crypto periods is to allow a more efficient distribution of the LEK keys used in the upper half 501 of FIG. 5. If a plurality of (e.g., 2, 10, or 100) MSs can be updated with a future LEK key pair via a single GKEK-encrypted broadcast, the number of individual transmissions required to update the remaining MSs with the future LEK key pair can be substantially reduced. If a particular MS is not in possession of a particular GKEK used to transmit an updated future LEK (and encrypted via the particular GKEK), the particular MS must then individually request a rekey by the authentication controller, which responds with the CLEK and/or SLEK in a unicast transmission encrypted with a link layer key encryption key (LKEK) unique to the particular MS. Because of the size of CLEK and/or SLEK updates (and other similar key updates), these transmission can consume substantial system and air-interface resources, and are preferably minimized.

As set forth in FIG. 5, two initial LEK crypto periods (LEK1 502 and LEK2 508) are specifically set forth, while two subsequent LEK crypto periods (LEKN 514 and LEKN+1 516) are illustrated simply to convey the repeating nature of the LEK crypto periods and their overlap with the GKEK crypto periods. During a particular LEK crypto period, for example LEK1 502, all communications between a particular BS (such as BS 201) and MSs being served by that BS (such as MSs 205, 209), are encrypted with a first LEK key pair associated with the LEK1 crypto period 502. During the LEK1 crypto period 502, the LEK associated with that period is considered the "current LEK," and a LEK associated with the next LEK crypto period LEK2 508 is considered to be a "future LEK." A packet called a key announcement broadcast (KAB) OSP transmitted by the BS may be used to inform MSs what LEK key pair is associated with a particular current and/or future LEK crypto period.

During the LEK1 crypto period 502, since all communications between the MSs and the BS are encrypted using the associated current LEK1 crypto period 502 key pair, MSs not already in possession of the current key are configured to immediately request the current key via the MS's serving BS. Such requests for the current key will, bandwidth and resource permitting, generally be fulfilled immediately, and may be provided to a requesting MS via an LKEK-encrypted unicast transmission to the requesting MS.

As illustrated in FIG. 5, the authentication controller may simultaneously track and manage GKEK crypto periods. Typically, GKEK crypto periods are much longer than LEK crypto periods, and may have crypto period lengths on the order of weeks, months, or years, compared to corresponding crypto period lengths on the order of hours, days, or weeks for the LEK. In some embodiments, however, one or more GKEK crypto periods may be shorter than an LEK crypto period.

As illustrated in FIG. 5, a first GKEK crypto period GKEK1 520 may overlap N number of LEK crypto periods LEK1 502-LEKN 514, and may be used to encrypt group transmissions of future LEK keys during one or more of those LEK crypto periods (e.g., transmission of a future LEK corresponding to LEK crypto period LEK2 508 during LEK crypto period LEK1 502, a future LEK corresponding to LEK crypto period LEKN+1 516 during LEK crypto period LEKN 514, etc.). At some point in time, illustrated at time 524 in FIG. 5, the authentication controller may be triggered to switch over from a first GKEK (e.g., corresponding to GKEK crypto period GKEK1 520) to a second different GKEK for a second subsequent GKEK crypto period GKEK2 522. The trigger may be caused for any number of reasons, such as an expiration of a timer, receipt of an input interface signal from a user at a console instructing the authentication controller to switch GKEKs, a determination that a sufficient number of MSs are now in possession of the second GKEK corresponding to crypto period GKEK2 522 (perhaps determined via authentication response ISPs received from authenticating MSs or via some other messaging protocol), or a determination that a number of MSs now in possession of the second GKEK corresponding to crypto period GKEK2 522 exceeds the number of MSs now in possession of the first GKEK corresponding to crypto period GKEK1 520. Other possibilities exist as well.

A KAB OSP transmitted at or before time period 524 may be used to signal the possible use of both the old GKEK associated with crypto period GKEK1 520 and the new GKEK associated with crypto period GKEK2 522. In at least some embodiments, a same KAB OSP may also signal an LEK transition, for example, a transition from an old LEK associated with LEK crypto period LEKN 514 to a new LEK associated with LEK crypto period LEKN+1 516. In such a case, a changeover time could be indicated in the KAB OSP for the LEK at a particular time (e.g., time 515). While the GKEK changes over from GKEK1 520 to GKEK2 522 at the same time as LEKN 514 changes over to LEKN+1 516 for ease of illustration, in practice the changeover of GKEKs are not indicated in the KAB OSP, and in fact in at least one embodiment is never indicated, and the only indication from the MS's perspective that the authentication controller has transitioned to using a new GKEK associated with crypto period GKEK2 522 would be via an indication in a future LEK key transmission that the new GKEK was used to encrypt the transmission. Accordingly, GKEK crypto periods may have dynamically varying or static integer or non-integer ratios with LEK crypto periods.

During the first LEK crypto period LEK1 502, a KAB OSP announcing a new future LEK associated with LEK crypto period LEK2 508 may be caused to be transmitted by an authentication controller and received at MSs from their respective serving BSs. MSs not already in possession of the future LEK associated with LEK crypto period LEK2 508 indicated in the KAB OSP may transmit individual requests for the future LEK to the authentication controller. As mentioned earlier, individually fulfilling each of these requests for the future key via unicast LKEK-encrypted transmissions would consume substantial system resources.

Similarly, when the GKEK crypto period rolls over from the first GKEK crypto period GKEK1 520 to the second GKEK crypto period GKEK2 522, MSs operating in the coverage area of a BS, for example, may immediately request the new current GKEK key associated with the second GKEK crypto period GKEK2 522, and the number of MSs not having the second GKEK crypto period GKEK2 522 (until provided via individual transmissions) may impair the ability of the system to efficiently provide future LEKs on a group basis. Further, individually fulfilling each of these requests via unicast LKEK-encrypted transmissions would similarly consume substantial system resources.

Accordingly, and as set forth in more detail below, an authentication controller is configured to reduce demands on system resources relating to these LLE rekeying situations by (i) MSs providing multiple GKEK possession status in authentication response ISPs, (ii) replying to individual requests for the future LEK with a broadcast transmission encrypted via a currently active GKEK and (iii) including in each KAB OSP both a first GKEK key ID and a second GKEK key ID (either of which may be used at any point in time to encrypt a group transmission of a future LEK) so as to allow the authentication controller to determine (via the authentication response ISPs) which GKEK would more efficiently distribute a future LEK at a particular point in time, and to allow the authentication controller to ease a new GKEK into service without the system loading issues noted above. Each of these scenarios and solutions will be discussed in more detail with respect to FIGS. 6-10 below.

III. Managing GKEK Crypto Periods, GKEK Key Status, and GKEK-Encrypted Future LEK Updates at the Authentication Controller As set forth in FIG. 6, an authentication controller in accordance with some embodiments is configured to perform a method 600 for managing GKEK crypto periods, GKEK key status, and GKEK-encrypted future LEK updates.

Figure 8:
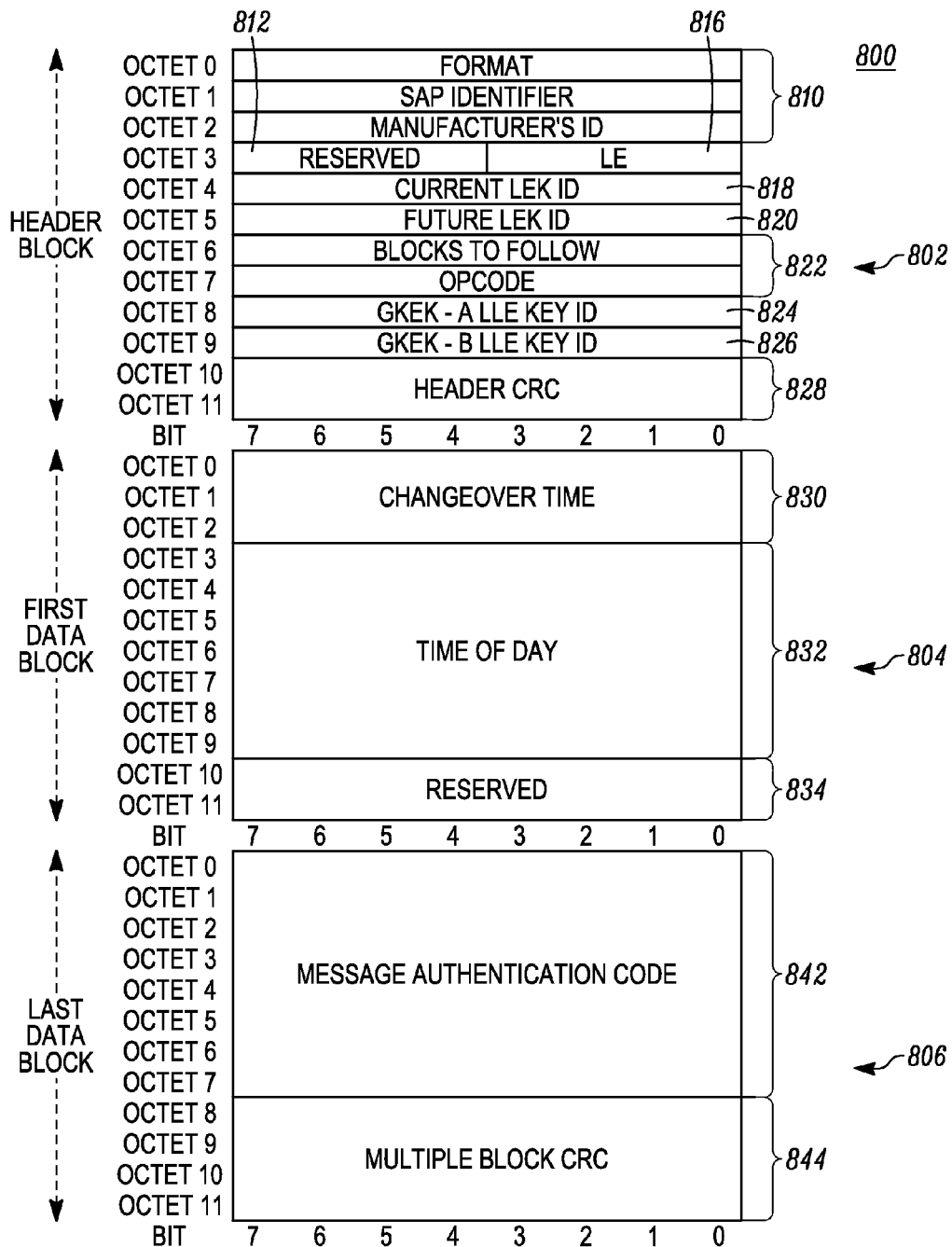
FIG. 8 is a block diagram illustrating an example key announcement broadcast outbound signalling packet in accordance with an embodiment.

Method 600 begins at step 602, where the authentication controller causes a first message (such as a KAB OSP) to be broadcast (via the one or more BSs under its control) indicating a first GKEK and a second GKEK. For example, the KAB OSP may be broadcast at time 519 in FIG. 5. An example KAB OSP 800 is set forth in FIG. 8. As set forth in FIG. 8, the KAB OSP 800 may be comprised of three separate data bursts, including a header block 802, a first data block 804, and a last data block 806. Although three separate data bursts are shown in FIG. 8, in other examples, more or less than three data bursts may be included in the KAB OSP 800. The first three octets 810 of the header block 802 include standards specific information fields such as a Format field identifying a message type and/or format, a Service Access Point (SAP) identifier field that indicates a destination of upper layer data, and a manufacturer's identity (ID) field, perhaps consistent with the P25 standard. The fourth octet may include one or more reserved fields 812 and an LLE encryption enabled field 816. The LLE encryption enabled field 816 may provide a mechanism for receiving devices to determine whether LLE is currently enabled on the communications link over which the key announcement OSP was transmitted.

The fifth octet may include a current LEK identifier (e.g., a current CLEK key identifier in one example) field 818 that identifiers which key is currently being used for LLE encryption for transmissions between BS(s) and MS(s). The sixth octet may include a future LEK identifier (e.g., a future CLEK key identifier in one example) field 820 that identifies which key will be used in a subsequent LEK crypto period for transmissions between BS(s) and MS(s). In another example, the LEK IDs in fields 818 and 820 may be current and/or future SLEK IDs.

The seventh-eight octets 822 may include additional standards specific information fields such as a blocks to follow field indicating whether additional data bursts follow the header block 802 and an opcode field set to indicate that the current message is a key announcement OSP.

The ninth octet 824 may include a first GKEK key ID identifying one of a first GKEK, a future GKEK, a slot-one GKEK, or a slot-A GKEK. The tenth octet 826 may include a second GKEK key ID identifying one of a second GKEK, a slot-two GKEK, or a slot-B GKEK. In at least some embodiments, instead of including two GKEK key IDs in the KAB OSP 800, only a single GKEK key ID field may be included in the KAB OSP 800.

Assuming that the KAB OSP 800 identifies two GKEK key IDs consistent with FIG. 8, either one of the GKEK IDs in octets nine and ten (but not both) may identify a currently active GKEK at any particular point in time. A number of possible methods may be used to identify which of the ninth and tenth octets identifies a currently active GKEK and which identifies a not currently active and/or future GKEK at any particular point in time. In one example, the authentication controller may cause either one to be used, and rely upon the MSs to determine which GKEK was used to encrypt a particular future LEK broadcast based on information included within the future LEK broadcast. In another example, the ninth octet (slot-one or slot-A) may be hardcoded in the authentication controller, BSs, and MSs to identify the currently active GKEK, while the tenth octet (slot-two or slot-B) is hardcoded to identify a not currently active GKEK (including, perhaps, a future GKEK). In another example, additional bits in the KAB OSP 800 may dynamically identify which of the ninth and tenth octets is currently being used to identify the currently active GKEK, and which is currently being used to identify the not currently active GKEK (including, perhaps, the future GKEK). Other possibilities exist as well. In at least some embodiments, more than two fields may be used in the KAB OSP 800 to indicate more than two GKEK identifiers that could be used in future LEK group updates. The eleventh and twelfth octets may include a CRC field 828 setting forth a CRC value used to verify the authenticity and/or correctness of the header block 802.

The first data block 804 includes a changeover time field 830, a time of day field 832, and a reserved field 834. The changeover time field 830 indicates a future time at which the future LEK indicated in the future LEK key ID field 820 will become the current LEK. There is no similar changeover time field for the GKEK IDs, as the authentication controller retains the authority to change which GKEK is used at any time. Accordingly, there are no predetermined GKEK crypto periods in the sense that there are advertised and preset LEK crypto periods. The time of day field 832 also includes a time stamp populated by the transmitting device that may be used by the receiving device for synchronization purposes.

The last data block 806 includes a message authentication code field 842 and a CRC field 844. In some embodiments, one or more additional data blocks may be inserted between the first data block 804 and the last data block 806. The message authentication code field 842 includes a calculated value that can be used to authenticate the key announcement OSP 800. The CRC field 844 sets forth a CRC value that may be used to verify the correctness of all of the data blocks sent in the key announcement OSP 800.

Returning to FIG. 6, at step 602, the authentication controller may determine which GKEK key IDs to populate in block 802 of KAB OSP 800 in view of tracking data that, based on the authentication response ISPs received from MSs during the authorization process in step 602, tracks how many MSs are currently in possession of the first and/or second GKEKs, or other GKEKs. For example, a first GKEK may be (or may have been) chosen based on the highest number of currently active MSs having that particular GKEK in their possession already, and the second GKEK may be chosen based on the second highest number of currently active MSs having that GKEK in their possession already. Other factors, such as the last time a particular GKEK was used, may also play into the determination (e.g., refrain from repeating the use of the same GKEK for a predetermined period of time after it was last used, and/or use all other available GKEKs before reusing a prior one). In those embodiments in which only a single GKEK is identified in the KAB OSP 800, information regarding how many MSs have the identified GKEK may be used to determine whether to use a GKEK-encrypted group update process at all, and/or whether to use individual LKEK-encrypted updates instead (e.g., perhaps waiting on the number of MSs to reach a threshold value or percent before implementing the group update process). In any event, and for exemplary purposes only, it will be assumed that the KAB OSP 800 transmitted at step 604 includes a first GKEK ID in the ninth octet 824, and includes a second GKEK ID in the tenth octet 826, either of which may be used to encrypt a future LEK broadcast at any time.

Figure 7:
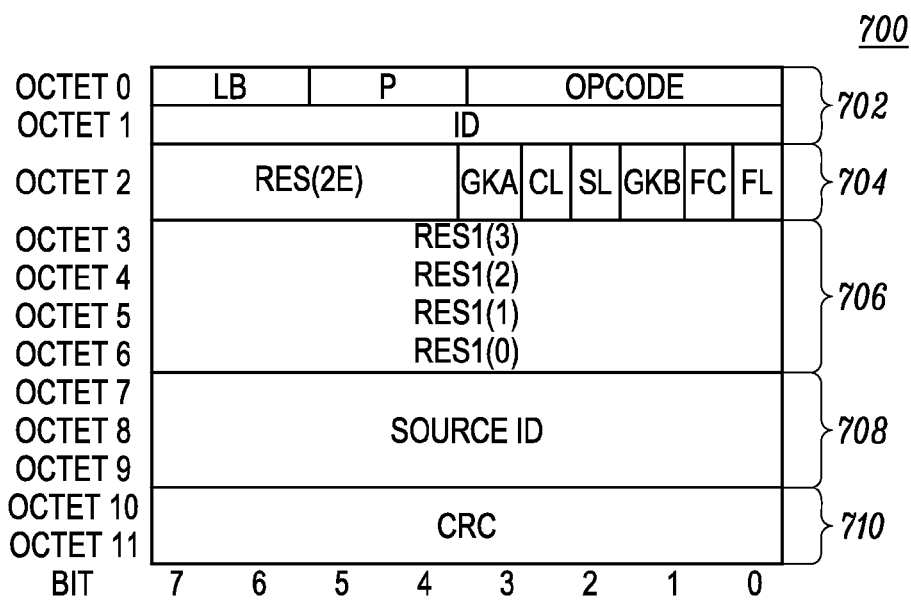
FIG. 7 is a block diagram illustrating an example authentication response inbound signalling packet in accordance with an embodiment.

At step 604, when the authentication controller authorizes a MS for service, and as part of that authorization, the authentication controller receives an authentication response ISP indicating GKEK key status for at least the GKEK(s) identified in the KAB OSP. FIG. 7 illustrates an example authentication response ISP data structure 700 that may be transmitted by a MS during the authorization process and received at the authentication controller at step 604. As illustrated in FIG. 7, the authentication response ISP data structure 700 is 12 octets long, of which the first two octets 702 include standards specific information such as a last block indicator LB, a protected flag P, an opcode identifying the message type, and a manufacturer's identity MID, perhaps in accordance with the P25 standard. The third octet 704 includes a reserved field and six key indicator fields GKA, CL, SL, GKB, FC, and FS. The GKA field is a one-bit field that may be used to indicate the presence of a first GKEK key (e.g., perhaps the GKEK in a first slot/slot-A of a previously transmitted KAB OSP) at the transmitting MS. The CL field is a one-bit field that may be used to indicate the presence of the current CLEK key at the transmitting MS. The SL field is a one-bit field that may be used to indicate the presence of the current SLEK key at the transmitting MS. The GKB field is a one-bit field that may be used to indicate the presence of a second GKEK key (e.g., perhaps the GKEK in a second slot/slot-B of a previously transmitted KAB OSP) at the transmitting MS. The FC field is a one-bit field that may be used to indicate the presence of the future CLEK key at the transmitting MS. The FS field is a one-bit field that may be used to indicate the presence of the future SLEK key at the transmitting MS. By indicating which GKEK keys the MS has in its possession via the authentication response ISP, the authentication controller 221 can more quickly provide missing GKEK keys to the MS (if it doesn't have it yet), and perhaps determine whether and when to transition to a next GKEK crypto period (and which GKEK to use for the next GKEK crypto period) based on the number of MSs that do or do not already have particular GKEKs in their possession. In at least some embodiments in which only a single GKEK is identified in the KAB OSP, the third octet 704 may be modified to include only a single key indicator field GKA, or may include both key indicator fields GKA and GKB with the value of the GKB field permanently set to a null or zero value. Similar to the case in which at least two GKEKs are identified in the KAB OSP, by indicating whether each MS has the single identified GKEK in its possession via the authentication response ISP, the authentication controller 221 can more quickly provide missing GKEK keys to the MS (if it doesn't have it yet), and perhaps determine whether and when to transition from or to using individual future LEK updates and group LEK updates based on the number of MSs that do or do not already have the particular GKEK in their possession. Other possibilities exist as well.

The fourth through seventh octets 706 are reserved, the eighth through tenth octets 708 comprise the source ID identifying the transmitting MS, and the eleventh and twelfth octets 710 include a cyclic-redundancy-check (CRC) to verify the authenticity of the authentication response ISP data structure 700 and/or detect transmission errors in the authentication response ISP data structure 700. Although the authentication response ISP data structure 700 provides one vehicle for providing MS LLE key status to the authentication controller, other data structures could also be used.

At step 606 in method 600, the authentication controller determines, as a function of the indications of which GKEKs each mobile station has in its possession received in step 604, which one of the first GKEK and the second GKEK to use in encrypting the first updated future LEK. In this example, it is assumed that the authentication controller determines that the first GKEK should be used, for any one or more of the reasons identified above, for example, including for the reason that the first GKEK is held by more MSs than the second GKEK. Of course, in embodiments in which only a single GKEK is identified in the KAB OSP, the authentication controller may, at step 606, determine whether and when to transition from or to using individual future LEK updates and group LEK updates based on the number of MSs that do or do not already have particular GKEK in their possession.

At step 608 in method 600, the authentication controller, during a first GKEK crypto period associated with the first GKEK, causes the first updated future LEK (such as an LEK associated with LEK crypto period LEK2 508 during LEK crypto period LEK1 502) to be encrypted via the first GKEK crypto period (e.g., a GKEK associated with GKEK crypto period GKEK1 520) and broadcast to the MSs. The updated future LEK transmission includes an identifier identifying the first GKEK as the GKEK to be used for decrypting the transmission. MSs receiving the group transmission and in possession of the first GKEK are able to decrypt the first updated future LEK and store it for future use in a subsequent LEK crypto period. MSs not receiving the group transmission or not in possession of the first GKEK can subsequently individually request the first updated future LEK from the authentication controller.

At step 610, the authentication controller, during a second GKEK crypto period associated with the second GKEK, causes a second updated future LEK, encrypted via the second GKEK, to be broadcast to the MSs. The second updated future LEK transmission includes an identifier identifying the second GKEK as the GKEK to be used for decrypting the transmission. MSs receiving the group transmission and in possession of the second GKEK are able to decrypt the second updated future LEK and store it for future use in a subsequent LEK crypto period. MSs not receiving the group transmission or not in possession of the second GKEK can subsequently individually request the second updated future LEK from the authentication controller.

Figure 6:
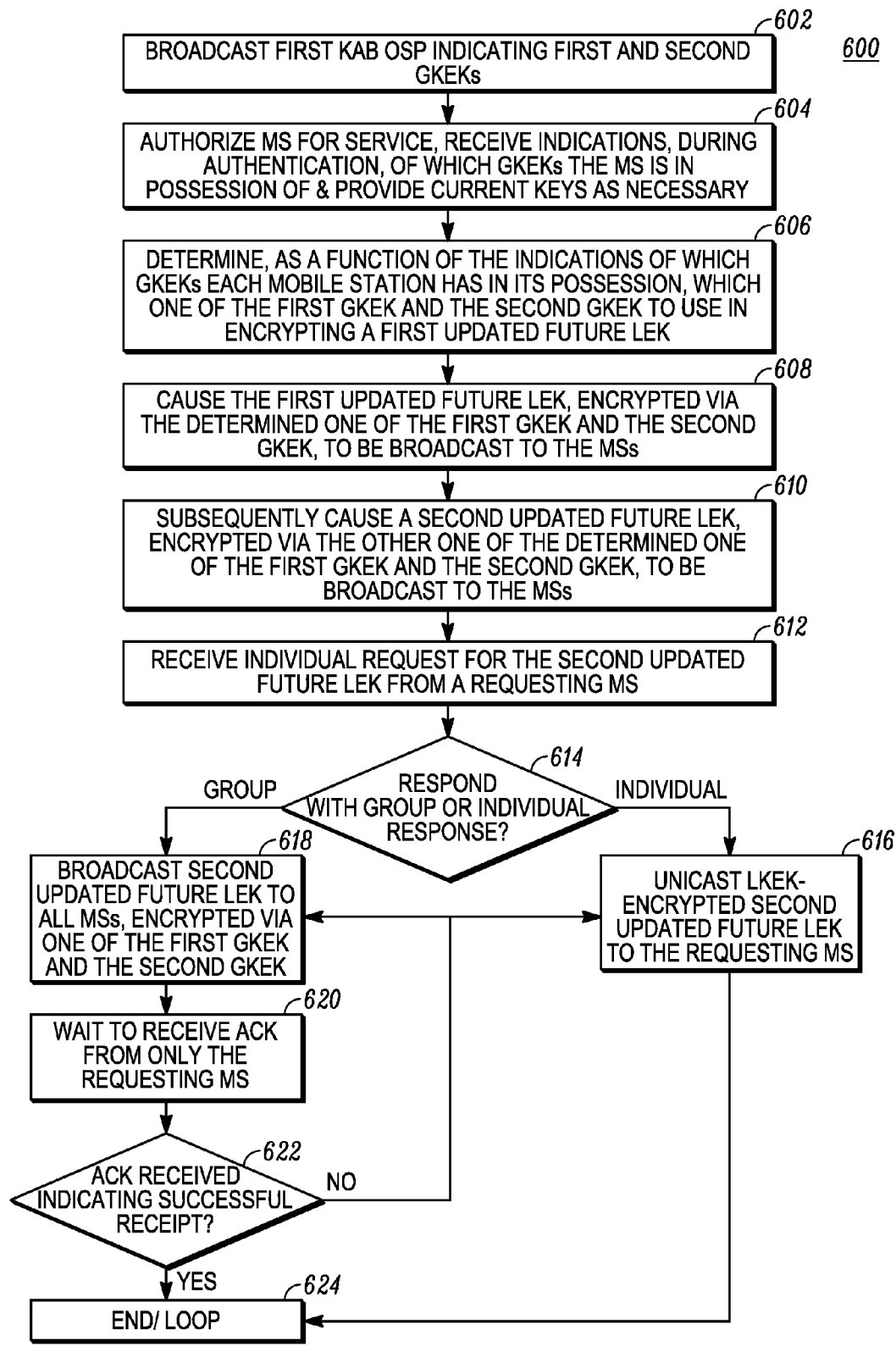
FIG. 6 is a flow chart setting forth an example method of an authentication controller managing multiple GKEKs and managing GKEK encrypted LEK update requests in accordance with an embodiment.

Optional steps 612-624 illustrate an example embodiment in which the authentication controller may automatically reply to individual rekey requests for a future LEK with a group transmission. While optional steps 612-624 are illustrated in FIG. 6 as occurring during or after the second GKEK crypto period for ease of illustration, in practice, optional steps 612-624 may occur at any time independent of GKEK and LEK crypto periods, and may, for example, occur during the first GKEK crypto period, and is directed to a more efficient way to respond to individual LEK rekey requests.

Figure 9:
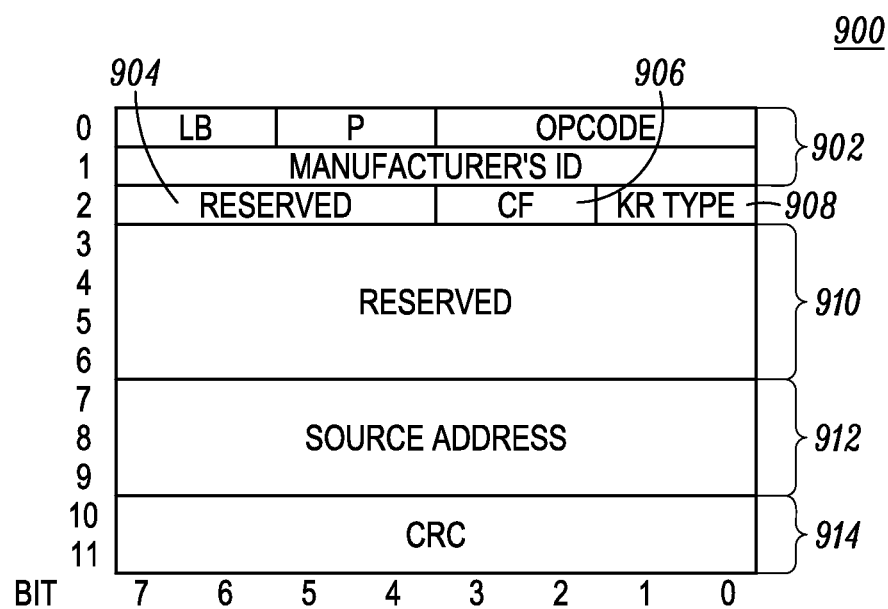
FIG. 9 is a block diagram illustrating an example rekey request inbound signalling packet in accordance with an embodiment.

At step 612, the authentication controller receives an individual request for an updated future LEK, such as the second updated future LEK, from a requesting MS. FIG. 9 sets forth an example of an individual rekey request 900 that may be transmitted from a MS to a BS and fulfilled via an authentication controller. An example individual rekey request 900 is set forth in FIG. 9. As illustrated in FIG. 9, the individual rekey request 900 is 12 octets long, of which the first two octets 902 include standards specific information such as a last block indicator LB field, a protected flag P field, an opcode field identifying the message type, and a manufacturer's identity ID field, perhaps consistent with the P25 standard. The third octet includes a reserved field 904, a current/future indicator field 906, and an LLE key request type field 908. The current/future indicator field 906 may be a single bit field that provides an indication of whether the transmitting MS is requesting a current LLE (or slot-one or slot-A GKEK) key or a future LLE (or slot-two or slot-B GKEK) key. For example, a binary value of "1" may indicate a future LLE key value (or a slot-two or slot-B key with respect to the GKEK key), and a value of "0" may indicate a current LLE key value (or slot-one or slot-A key with respect to the GKEK key). The LLE key request type field 908 may be a double-bit field that indicates a type of LLE key being requested (e.g., CLEK, SLEK, GKEK, etc.). For example, a binary value of "01" may indicate CLEK, while a value of "11" may indicate GKEK. Other possibilities exist as well. An additional reserved field 910 may be included in the individual rekey requests 900, followed by a source address field 912 indicating a source ID of the transmitting MS. The eleventh and twelfth octets 914 include a CRC to verify the authenticity of the individual rekey request 900 message. Although the individual rekey request 900 data structure illustrated in FIG. 9 provides one mechanism for individually requesting LLE key updates to the authentication controller 221, other data structures could additionally or alternatively be used.

Returning to FIG. 6, at step 614, the authentication controller decides whether it should respond to the individual request with a GKEK-encrypted group (multicast or broadcast) transmission or an LKEK-encrypted individual (unicast) transmission including the second updated future LEK. A number of variables may be factored into the decision at step 614. For example, if a threshold number of MSs request the second updated future LEK, the authentication controller may be more inclined to respond with, and may respond with, a group transmission instead of one or more individual unicast transmissions. If the authentication response ISP received by the authentication controller when the requesting MS authenticated indicates that the requesting MS is not currently in possession of the currently active GKEK, and no record of transmission of the currently active GKEK indicates that the MS should have received it since authorization, the authentication controller may be more inclined to respond with, and may respond with, an individual transmission (or perhaps an individual transmission followed by a group transmission or vice versa).

If the authentication controller already responded to the same requesting MS with a group transmission, and it is receiving another subsequent individual request from the same MS, the authentication controller may be more inclined to respond with, and may respond with, an individual transmission (or perhaps an individual transmission followed by a group transmission or vice versa). If the authentication controller already responded to the same requesting MS with a group transmission, and it is receiving an individual acknowledgment of the group transmission that includes an indication that the MS could not recover the future LEK from the group transmission, the authentication controller may be more inclined to respond with, and may respond with, an individual transmission (or perhaps an individual transmission followed by a group transmission or vice versa).

Additionally or alternatively, if the authentication controller determines at step 614 that a threshold number of MSs operating in the radio network do not have the future updated LEK, the authentication controller may be more inclined to respond with, and may respond with, a group transmission. The threshold may be, for example, a pre-determined integer value such as between 4 and 50. Additionally or alternatively, the threshold may be, for example, a relative value such as between 40% and 100% of active or potentially active MSs. Other examples are possible as well.

If, at step 614, the authentication controller determines that it should transmit an individual transmission, method 600 proceeds to step 616 in which the authentication controller causes the second updated future LEK encrypted via an LKEK key individually associated with the requesting MS to be transmitted to the requesting MS in a unicast transmission. After step 616, the method proceeds to step 624 where the process either ends or loops back to step 604 (with new GKEK keys/crypto periods).

If, on the other hand, the authentication controller determines at step 614 that it should transmit a group transmission, method 600 proceeds to step 618 in which the authentication controller causes a group transmission including the second updated future LEK, encrypted via the second GKEK, to be transmitted to all MSs under its control (e.g., via BSs 201 and/or 251 in the example of FIG. 2). At optional step 620, the authentication controller may wait to receive an acknowledgment from only the requesting MS acknowledging receipt of the group transmission. In another embodiment, the authentication controller may broadcast the second GKEK-encrypted second updated future LEK at step 618 in an unacknowledged manner, and proceed directly to step 624. At step 622, and assuming that the broadcast at step 618 is an acknowledged broadcast, the authentication controller determines whether an acknowledgment was received indicating a successful recovery of the second updated future LEK. If such an acknowledgment is received from the requesting MS, method 600 proceeds to step 624. However, if no acknowledgment is received, or an acknowledgment is received indicating that the requesting MS was unable to recover the second updated future LEK from the group transmission, processing may proceed to either step 616 or step 618.

If no acknowledgment is received at step 620, the authentication controller may loop back and re-broadcast the GKEK-encrypted second updated future LEK at step 618 and see if an acknowledgment of the re-broadcast is received at step 622. If no acknowledgment is received again at step 620, or an acknowledgment was received the first time indicating that the requesting MS does not have the required second GKEK to recover the second updated future LEK, then processing may proceed to step 616 where the authentication controller reverts to transmitting the second updated future LEK via a unicast LKEK-encrypted transmission that is decipherable only by the requesting MS.

IV. Mobile Station Operation for Aiding the Authentication Controller in the Managing of GKEK Crypto Periods, GKEK Key Status, and GKEK-Encrypted Future LEK Updates A MS such as MS 205 operating to aid the authentication controller in managing multiple GKEK crypto periods, multiple corresponding GKEKs, and GKEK encrypted future LEK updates may perform the method 1000 set forth in FIG. 10.

At step 1002, the MS receives a first message (such as a KAB OSP) indicating a first GKEK and a second GKEK, either of which may be used to group transmit future LEKs. For example, the KAB may be broadcast at time 519 in FIG. 5. The KAB OSP transmitted in step 1002 may have the structure of the KAB OSP 800 already set forth above with respect to FIG. 8. In at least some embodiments, the KAB OSP received at step 1002 may identify only a single GKEK, and in other embodiments, more than two GKEKs.

At step 1004, the MS registers with and authorizes with a radio network, and during the authorization process, provides an authentication response ISP that indicates GKEK key status at the MS for at least the one or more GKEKs identified in the KAB OSP. The authentication response ISP provided by the MS in step 1004 may comport with the example authentication response ISP data structure 700 already described above with respect to FIG. 7. In at least some embodiments in which the KAB OSP received at step 1002 identified only a single GKEK (e.g., the first GKEK), the authentication response ISP transmitted by the MS in step 1004 may indicate only whether the MS has the single GKEK identified in the KAB OSP in its possession.

At step 1006, and during a first GKEK crypto period associated with the first GKEK, the MS receives an updated future LEK encrypted via the first GKEK, and at step 1008, uses the first GKEK to decrypt and recover the updated future LEK. Of course, if the MS is not currently in possession of the first GKEK, it could individually request the updated future LEK via a rekey request (perhaps using the individual rekey request structure already set forth above with respect to FIG. 9) sent to the authentication controller via its serving BS.

At step 1008, and assuming that the MS is in possession of the first GKEK, the MS uses the first GKEK to decrypt and recover the updated future LEK for use in a subsequent LEK crypto period to encrypt and/or decrypt communications between itself and its serving BS.

Figure 10:
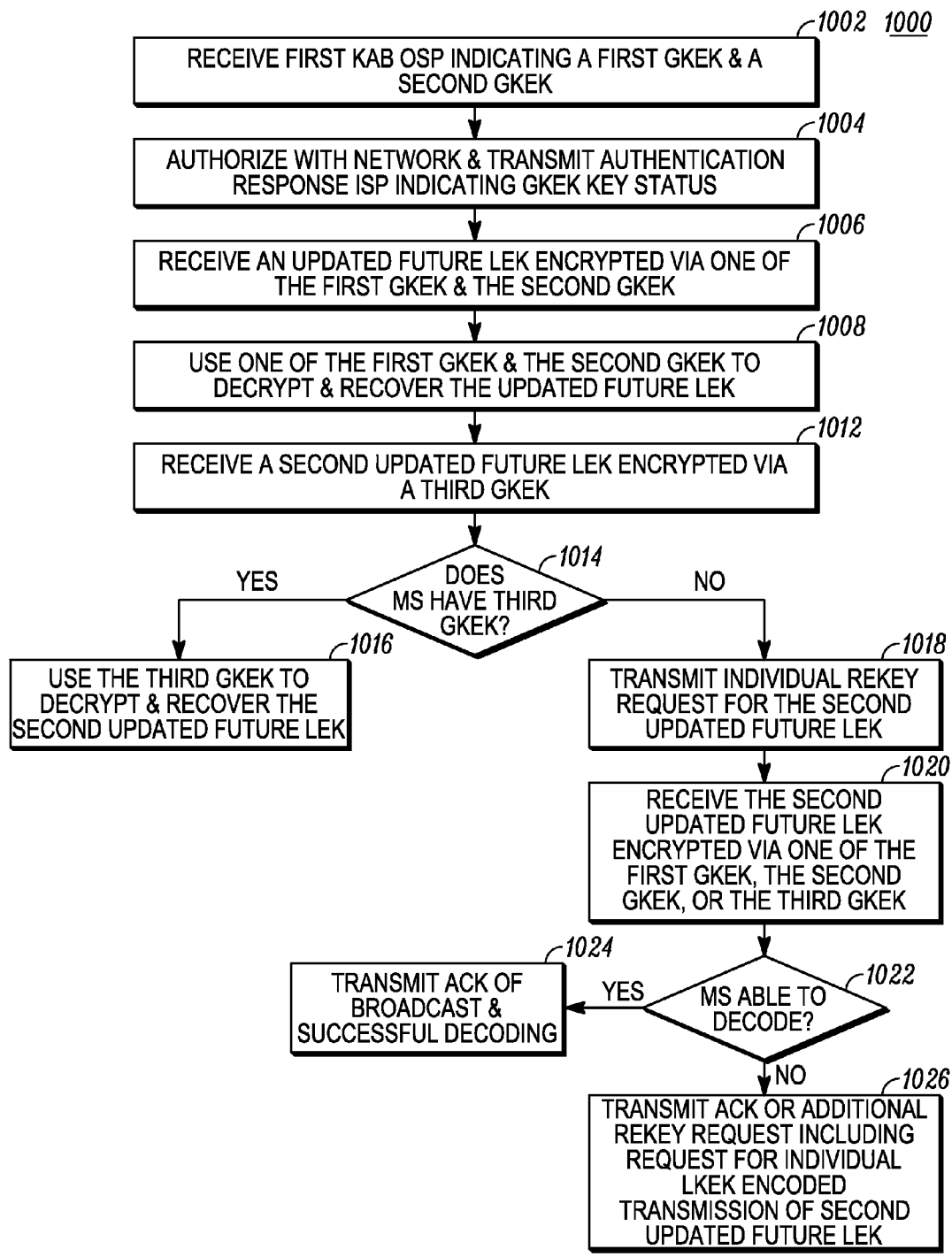
FIG. 10 is a flow chart setting forth an example method of a mobile station managing multiple GKEKs and managing GKEK encrypted LEK update requests in accordance with an embodiment.

At step 1012, the MS may receive a second updated future LEK encrypted via a third GKEK (perhaps a new GKEK different from the first and second GKEKs, or perhaps the same as the first or second GKEK). Optional steps 1014 and 1018-1026 illustrate an example embodiment in which the MS does not have the third GKEK to recover the second updated future LEK received at step 1012. While optional steps 1014 and 1018-1026 are illustrated in FIG. 10 as occurring during a second GKEK crypto period for ease of illustration, in practice, optional steps 1014 and 1018-1026 may occur at any time independent of GKEK and LEK crypto periods, and may, for example, occur during the first GKEK crypto period, and is directed to a more efficient way to handle individual LLE rekey requests.

At step 1014, the MS determines whether it has the third GKEK in its possession so that it can recover the second updated future LEK received at step 1012. If the MS does have the third GKEK in its possession, method 1000 proceeds to step 1016, during which the MS recovers the second updated future LEK using the third GKEK in its possession and uses it in a subsequent LEK crypto period.

If, however, the MS determines that it is not currently in possession of the third GKEK at step 1014, and is not already in possession of the second updated future LEK, method 1000 proceeds to step 1018 in which the MS transmits an individual rekey request for the second updated future LEK to the authentication controller via its serving BS. In other embodiments, the individual request may be triggered solely by the MS's determination that it is not currently in possession of the second updated future LEK, without any step of determining that it is not in possession of a GKEK used to previously transmit the second updated future LEK. As set forth earlier, FIG. 9 sets forth an example of an individual rekey request 900 that may be transmitted from a MS to a BS and fulfilled via an authentication controller consistent with step 1018. At step 1020, instead of transmitting an individual unicast transmission containing the second updated future LEK that is LKEK-encrypted so that only the requesting MS can recover the second updated future LEK, the authentication controller causes a GKEK-encrypted broadcast of the second updated future LEK to be transmitted, encrypted using one of the first GKEK, the second GKEK, or the third GKEK (e.g., a GKEK indicated in one of the first and second GKEK IDs in a previously transmitted KAB OSP), and received at the requesting MS.

At step 1022, the MS determines whether it is able to recover the second updated future LEK received via the broadcast transmission (e.g., whether it now has the GKEK necessary to decrypt the transmission). If the MS is able to recover the second updated future LEK, the requesting MS (and only the requesting MS) transmits an acknowledgment packet to the authentication controller acknowledging receipt and successful recovery of the second updated future LEK via the group transmission.

If, however, the MS is unable to recover the second updated future LEK at step 1022, processing proceeds to step 1026 in which the MS either transmits an acknowledgment of the broadcast transmission but includes an indication in the acknowledgment that it could not decode the transmission (due to a lack of possession of the third GKEK) and a request for an individual transmission of the second updated future LEK, or separately transmits an additional subsequent rekey request again individually requesting the second updated future LEK from the authentication controller. In response to receiving either one of the acknowledgment message indicating an inability to recover the second updated future LEK or the second individual rekey request, the authentication controller provides the second updated future LEK to the requesting MS via an LKEK-encrypted unicast transmission such that the transmission is only decipherable by the requesting MS.

In light of the foregoing, and by providing a radio system, method, and device for managing multiple GKEKs and GKEK encrypted LEK updates consistent with the foregoing, applicable to air-interface protocols such as P25, over-the-air bandwidth requirements maybe reduced, substantial delays and performance degradation may be avoided, and management and distribution of GKEKs and GKEK-encrypted LEKs may be handled more intelligently. Other benefits are possible as well.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method of group rekeying radios for link layer encryption (LLE) in a radio network comprising a plurality of network locations, the method comprising, at a radio network communications device:
   broadcasting a first key announcement broadcast (KAB) outgoing signalling packet indicating (i) a first group key link layer encryption key (GKEK) used for LLE encrypting and decrypting updated future LLE keys (LEKs), the updated future LEKs to be used for LLE encrypting and decrypting inbound and outbound group communications between a base station and mobile stations operating within a corresponding coverage area of the base station, and (ii) at least a second GKEK;
   receiving, via respective authentication response inbound signalling packets from each of the mobile stations, an indication of which GKEKs each mobile station has in its possession, and storing the indications;
   determining, as a function of the indications of which GKEKs each mobile station has in its possession, which one of the first GKEK and the second GKEK to use in encrypting a first updated future LEK; and
   causing the first updated future LEK to be encrypted via the determined one of the first GKEK and the second GKEK, and to be broadcast to the mobile stations.

2. The method of claim 1, further comprising causing a second updated future LEK to be encrypted via the other of the determined one of the first GKEK and the second GKEK and broadcast to the mobile stations.

3. The method of claim 2, wherein the network communications device chooses one of the first and the second GKEK to encrypt an updated future LEK without indicating to the mobile stations that either of the first or second GKEKs are active or current, and without providing any indication of a changeover time from the first GKEK to the second GKEK or from the second GKEK to the first GKEK.

4. The method of claim 1, further comprising subsequently broadcasting a second KAB outgoing signalling packet indicating a third GKEK different from the first and second GKEKs.

5. The method of claim 4, wherein the third GKEK replaces the first GKEK in the second KAB, leaving the second GKEK in the same position as the first KAB.

6. The method of claim 4, wherein the second GKEK is moved to the first GKEK position in the second KAB, and the third GKEK is moved into the position previously occupied by the second GKEK.

7. The method of claim 4, wherein the third GKEK is chosen as a function of the indications of which GKEKs each mobile station has in its possession.

8. The method of claim 1, further comprising causing individual selected ones of the mobile stations to be updated with the other of the determined one of the first GKEK and the second GKEK, each individual transmission of the other of the determined one of the first GKEK and the second GKEK being encrypted with a link layer key encryption key (LKEK) unique to each selected one of the plurality of mobile stations.

9. The method of claim 1, further comprising receiving an individual request for the updated LEK from a particular one of the mobile stations that is not in possession of the determined one of the first GKEK and the second GKEK, and causing the updated LEK to be individually transmitted to the particular one of the plurality of mobile stations encrypted with a link layer key encryption key (LKEK) unique to the particular one of the mobile stations.

10. The method of claim 9, further comprising, responsive to receiving the individual request for the updated LEK, and at a subsequent point in time based on system loading, providing the determined one of the first GKEK and the second GKEK to the particular one of the plurality of mobile stations encrypted with the LKEK unique to the particular one of the mobile stations.

11. The method of claim 1, further comprising, in response to receiving an individual request for an updated future LEK from a particular one of the mobile stations, causing the updated future LEK to be re-broadcast to the mobile stations encrypted via one of the first and second GKEKs.

12. The method of claim 11, further comprising, receiving an acknowledgment response from only the particular one of the mobile stations acknowledging receipt of the updated future LEK re-broadcast.

13. The method of claim 11, further comprising receiving an acknowledgment response from only the particular one of the mobile stations acknowledging receipt of the updated future LEK re-broadcast and also indicating that the particular one of the mobile stations is not in possession of the one of the first and second GKEKs used to encrypt the updated future LEK re-broadcast, and requesting that the updated future LEK be individually transmitted to the particular one of the mobile stations encrypted with the LKEK unique to the particular one of the mobile stations.

14. The method of claim 1, wherein the first and second updated future LEKs are one of (i) first and second common link layer encryption keys (CLEKs) used to LLE encrypt inbound and outbound communications between the base station and the mobile stations operating within the corresponding coverage area of the base station during normal operation, and (ii) first and second static link layer encryption keys (SLEKs) used to LLE encrypt inbound and outbound communications between the base station and the mobile stations operating within the corresponding coverage area of the base station when network connectivity between the base station and the radio network is reduced or eliminated.

15. The method of claim 1, wherein the radio network communications device is one of a zone controller and an authentication controller.

16. The method of claim 1, wherein the base station and mobile stations communicate over an air interface in accordance with a P25 protocol.

17. A radio network communications device in a radio network comprising a plurality of network locations, the radio network communications device comprising:
a transceiver;
a processor; and
a computer readable medium having instructions stored thereon that, in response to execution by the processor, cause the radio network communications device to perform operations comprising:
broadcasting a first key announcement broadcast (KAB) outgoing signalling packet indicating (i) a first group key link layer encryption key (GKEK) used for LLE encrypting and decrypting updated future LLE keys (LEKs), the updated future LEKs to be used for LLE encrypting and decrypting inbound and outbound group communications between a base station and mobile stations operating within a corresponding coverage area of the base station, and (ii) at least a second GKEK;
receiving, via respective authentication response inbound signalling packets from each of the mobile stations, an indication of which GKEKs each mobile station has in its possession, and storing the indications;
determining, as a function of the indications of which GKEKs each mobile station has in its possession, which one of the first GKEK and the second GKEK to use in encrypting a first updated future LEK; and
causing the first updated future LEK to be encrypted via the determined one of the first GKEK and the second GKEK, and to be broadcast to the mobile stations.

18. A method of group rekeying radios for link layer encryption (LLE) in a radio network comprising a plurality of network locations, the method comprising, at a mobile station:
receiving a first key announcement broadcast (KAB) outgoing signalling packet indicating (i) a first group key link layer encryption key (GKEK) used for LLE encrypting and decrypting updated future LLE keys (LEKs), the updated future LEKs to be used for LLE encrypting and decrypting inbound and outbound group communications between a base station and mobile stations operating within a corresponding coverage area of the base station, and (ii) at least a second GKEK
during authentication with the radio network, transmitting an authentication response inbound signalling packet indicating which GKEKs, of at least the first and second GKEKs, the mobile station has in its possession;
receiving a first updated future LEK broadcast encrypted via one of the first GKEK and the second GKEK; and
decrypting and retrieving the first updated future LEK using the one of the first GKEK and second GKEK as indicated in the received broadcast.

19. The method of claim 18, further comprising receiving a second updated future LEK broadcast encrypted via the other of the one of the first GKEK and second GKEK as indicated in the second received broadcast.

20. The method of claim 19, wherein the mobile station chooses one of the first and the second GKEK to decrypt an updated future LEK without receiving any indication that either of the first or second GKEKs are active or current, and without receiving any indication of a changeover time from the first GKEK to the second GKEK or from the second GKEK to the first GKEK.

21. The method of claim 18, further comprising a second mobile station transmitting an individual rekey request for an updated future LEK;
the second mobile station receiving, in response to the transmitted individual rekey request for the updated future LEK, the updated future LEK via a broadcast transmission encrypted via one of the first GKEK and the second GKEK; and
responsive to receiving the updated future LEK via the broadcast transmission, only the second mobile station individually acknowledging the broadcast transmission via a single unicast acknowledgment packet acknowledging receipt and successful recovery of the updated future LEK.

22. The method of claim 18, further comprising a second mobile station transmitting an individual rekey request for an updated future LEK;
the second mobile station receiving, in response to the transmitted individual rekey request for the updated future LEK, the updated future LEK via a broadcast transmission encrypted via one of the first GKEK and the second GKEK; and
responsive to determining that the second mobile station is not currently in possession of the one of the first GKEK and second GKEK or that it is unable to retrieve the first updated future LEK for some other reason, the second mobile station individually acknowledging the broadcast transmission via a single unicast acknowledgment packet
and including an indication in the unicast transmitted acknowledgment packet requesting that the updated future LEK be individually transmitted to the second mobile station encrypted with the LKEK unique to the second mobile station.

23. The method of claim 18, wherein the first and second updated future LEKs are one of (i) first and second common link layer encryption keys (CLEKs) used to LLE encrypt inbound and outbound communications between the base station and the mobile stations operating within the corresponding coverage area of the base station during normal operation, and (ii) first and second static link layer encryption keys (SLEKs) used to LLE encrypt inbound and outbound communications between the base station and the mobile stations operating within the corresponding coverage area of the base station when network connectivity between the base station and the radio network is reduced or eliminated.

24. The method of claim 18, wherein the base station and mobile stations communicate over an air interface in accordance with a P25 protocol.

25. A mobile station in a radio network comprising a plurality of network locations, the mobile station comprising:
- a wireless transceiver;
- a processor; and
- a computer readable medium having instructions stored thereon that, in response to execution by the processor, cause the mobile station to perform operations comprising:
  - receiving a first key announcement broadcast (KAB) outgoing signalling packet indicating (i) a first group key link layer encryption key (GKEK) used for LLE encrypting and decrypting updated future LLE keys (LEKs), the updated future LEKs to be used for LLE encrypting and decrypting inbound and outbound group communications between a base station and mobile stations operating within a corresponding coverage area of the base station, and (ii) at least a second GKEK
  - during authentication with the radio network, transmitting an authentication response inbound signalling packet indicating which GKEKs, of at least the first and second GKEKs, the mobile station has in its possession;
  - receiving a first updated future LEK broadcast encrypted via one of the first GKEK and the second GKEK; and
  - decrypting and retrieving the first updated future LEK using the one of the first GKEK and second GKEK as indicated in the received broadcast.

* * * * *

UNITED STATES PATENT AND TRADEMARK OFFICE
CERTIFICATE OF CORRECTION

PATENT NO. : 8,781,132 B2  
APPLICATION NO. : 13/678747  
DATED : July 15, 2014  
INVENTOR(S) : Chris A. Kruegel et al.

Page 1 of 1

It is certified that error appears in the above-identified patent and that said Letters Patent is hereby corrected as shown below:

IN THE TITLE PAGE:

Under "ABSTRACT," Item (57), in Column 2, Line 4, delete "(GKEK)s it" and insert -- (GKEKs) is --, therefor.

Under "ABSTRACT," Item (57), in Column 2, Line 14, delete "to with a" and insert -- with a --, therefor.

IN THE SPECIFICATION:

In Column 5, Line 39, delete "(e.g.," and insert -- (e.g. --, therefor.

In Column 5, Line 65, delete "207" and insert -- 209 --, therefor.

IN THE CLAIMS:

In Column 22, Line 2, in Claim 18, delete "GKEK" and insert -- GKEK; --, therefor.

In Column 22, Line 52, in Claim 22, delete "packet" and insert -- packet; --, therefor.

In Column 24, Line 5, in Claim 25, delete "GKEK" and insert -- GKEK; --, therefor.

Signed and Sealed this  
Third Day of May, 2016

Michelle K. Lee  
*Director of the United States Patent and Trademark Office*